US011151797B2

(12) United States Patent
Meerbeek et al.

(10) Patent No.: US 11,151,797 B2
(45) Date of Patent: Oct. 19, 2021

(54) SUPERIMPOSING A VIRTUAL REPRESENTATION OF A SENSOR AND ITS DETECTION ZONE OVER AN IMAGE

(71) Applicant: SIGNIFY HOLDING B.V., Eindhoven (NL)

(72) Inventors: Berent Willem Meerbeek, Eindhoven (NL); Dirk Valentinus René Engelen, Eindhoven (NL); Jochen Renaat Van Gheluwe, Eindhoven (NL); Bartel Marinus Van De Sluis, Eindhoven (NL); Anthonie Hendrik Bergman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/045,819

(22) PCT Filed: Apr. 1, 2019

(86) PCT No.: PCT/EP2019/058175
§ 371 (c)(1),
(2) Date: Oct. 7, 2020

(87) PCT Pub. No.: WO2019/197196
PCT Pub. Date: Oct. 17, 2019

(65) Prior Publication Data
US 2021/0150816 A1 May 20, 2021

(30) Foreign Application Priority Data

Apr. 9, 2018 (EP) .................................... 18166316

(51) Int. Cl.
*G06T 19/00* (2011.01)
*H05B 47/115* (2020.01)
(Continued)

(52) U.S. Cl.
CPC ............ *G06T 19/006* (2013.01); *G06T 13/40* (2013.01); *G06T 15/506* (2013.01);
(Continued)

(58) Field of Classification Search
None
See application file for complete search history.

(56) References Cited

U.S. PATENT DOCUMENTS 10,839,608 B2 * 11/2020 Mittleman .............. G06T 19/20
2005/0002662 A1 1/2005 Arpa et al.
(Continued)

FOREIGN PATENT DOCUMENTS

EP 2482260 A2 8/2012
EP 3114591 A2 1/2017
(Continued)

OTHER PUBLICATIONS

Sander Veenhof, "Watch Your Privacy" https://web.archive.org/web/20140625024011/http://www.sndrv.nl/watchyourprivacy/, 2014. (Year: 2014).*

*Primary Examiner* — Nicholas R Wilson

(57) ABSTRACT

An electronic device (1) is configured to obtain an image captured with a camera, determine a location for a sensor, determine a detection zone of the sensor in relation to the image based on the location determined for the sensor, and display the image, a virtual representation (54) of the sensor and a virtual representation (55) of the detection zone superimposed over the image. The electronic device is configured to allow a user to specify or adapt at least one property for the sensor (17). This at least one property includes the location for the sensor and may further include the orientation and/or the settings of the sensor.

19 Claims, 5 Drawing Sheets

(51) Int. Cl.
*H05B 47/19* (2020.01)
*G06T 13/40* (2011.01)
*G06T 15/50* (2011.01)

(52) U.S. Cl.
CPC ........... *H05B 47/115* (2020.01); *H05B 47/19* (2020.01); *G06T 2200/24* (2013.01)

(56) References Cited

U.S. PATENT DOCUMENTS

| | | |
|---|---|---|
| 2010/0185969 A1 | 7/2010 | Wendt et al. |
| 2012/0095745 A1 | 4/2012 | Le Guevel-Scholtens et al. |
| 2013/0214698 A1 | 8/2013 | Aliakseyeu et al. |
| 2015/0077566 A1 | 3/2015 | Xiao et al. |

FOREIGN PATENT DOCUMENTS

| | | |
|---|---|---|
| WO | 2013011395 A2 | 1/2013 |
| WO | 2015170316 A1 | 11/2015 |
| WO | 2017067864 A1 | 4/2017 |

* cited by examiner

SUPERIMPOSING A VIRTUAL REPRESENTATION OF A SENSOR AND ITS DETECTION ZONE OVER AN IMAGE

CROSS-REFERENCE TO PRIOR APPLICATIONS

This application is the U.S. National Phase application under 35 U.S.C. § 371 of International Application No. PCT/EP2019/058175, filed on Apr. 1, 2019, which claims the benefit of European Patent Application No. 18166316.2, filed on Apr. 9, 2018. These applications are hereby incorporated by reference herein.

FIELD OF THE INVENTION

The invention relates to an electronic device for superimposing a detection zone over an image.

The invention further relates to a method of superimposing a detection zone over an image.

The invention also relates to a computer program product enabling a computer system to perform such a method.

BACKGROUND OF THE INVENTION

Smart lighting can be connected to sensors so the light triggers when some event in the environment is detected. For example, a Philips Hue lighting system can be connected to a motion sensor such that the light switches on when people enter the room. One major issue when considering purchasing such a sensor is whether it will work properly and one major issue when installing such a sensor is how to make it work properly.

US 2015/0077566 discloses a method in which a PIR detector equipped with a PIR sensor and a camera records camera images on which a range and signal strength of the PIR sensor is superimposed. This allows an installer of a security system to perform a walking test by walking through the area in front of the PIR sensor. Afterwards, the installer can playback the recorded video on a computer to determine how the PIR sensor thresholds need to be adjusted in order to cover the locations in which intrusions should be detected.

A drawback of this method is that it can only be used in a limited number of situations and only with detectors that are able to record camera images.

SUMMARY OF THE INVENTION

It is a first object of the invention to provide an electronic device, which facilitates installation of a sensor in a wide range of situations.

It is a second object of the invention to provide a method, which facilitates installation of a sensor in a wide range of situations.

In a first aspect of the invention, the electronic device comprises at least one processor configured to obtain an image captured with a camera, determine a location for a sensor, determine a detection zone of said sensor in relation to said image based on said location determined for said sensor, and display said image and virtual representations of said sensor and said detection zone superimposed over said image, wherein said at least one processor is configured to allow a user to specify or adapt at least one property for said sensor, said at least one property including said location. The electronic device may be a mobile phone, a tablet, augmented reality glasses or an augmented reality headset, for example.

Said at least one processor may be configured to obtain a further image captured with said camera, determine a further detection zone of said sensor in relation to said further image based on said at least one adapted property, and display said further image and virtual representations of said sensor and said further detection zone superimposed over said further image. A detection zone may correspond to a field of view and/or a detection range, for example. A detection zone may depend on a sensor setting, e.g. a sensitivity setting.

The inventors have recognized that by superimposing virtual representations of the sensor and its detection zone on camera images, preferably in real-time or near-real-time, this augmented reality view can be used to determine whether the sensor is able to work properly and/or how the sensor can be made to work properly. The sensor may yet to be installed (and may even yet to be purchased) or the sensor may have already been installed, but possibly at an inappropriate or suboptimal location.

Since no real sensor needs to be present with the same location as the represented sensor, the invention can be used in a wide range of situations, e.g. before the sensor is purchased, before the sensor is installed or before the sensor is repositioned, and the sensor does not need to incorporate a camera that captures and transmits images. The electronic device user may allow a user to specify a potential location for a sensor that he wishes to install or the electronic device may determine a current or suggested location for the sensor and allow the user to adapt the location, for example.

Said at least one processor may be configured to simulate dynamic input to said sensor and display a dynamic virtual representation of said dynamic input superimposed over said image. This allows the user to test at what moment input triggers the sensor. The sensor may comprise a motion detector and/or a heat detector, for example.

Said sensor may comprise a presence sensor and said at least one processor may be configured to display an animation of a virtual character walking through the physical space captured by said image as said dynamic virtual representation. This allows the user to test at what moment input triggers the presence sensor.

Said at least one processor may be configured to simulate said dynamic input causing said sensor to generate sensor output and control a virtual lighting device and/or an installed lighting device based on said sensor output. This allows the user to see which lighting device is triggered in response to the input and at what moment.

Said at least one processor may be configured to simulate said dynamic input causing said sensor to generate sensor output, simulate a light effect generated by said virtual lighting device in response to said sensor output, said light effect being generated based on a location and an orientation of said virtual lighting device, and display said simulated light effect superimposed over said image. This allows the user to see which virtual lighting device is triggered in response to the input in the augmented reality view.

Said at least one property for said sensor may further include an orientation for said sensor. This is beneficial if the sensor is not an omnidirectional sensor. If the sensor is not an omnidirectional sensor, the detection zone is preferably determined in relation to the image based on both the location and the orientation determined for the sensor.

Said at least one property for said sensor may further include one or more settings for said sensor. By allowing the user to specify or adapt one or more settings for the sensor, e.g. its sensitivity, the user can check whether the desired coverage can be obtained with these one or more settings.

Said at least one processor may be configured to allow said user to configure said sensor with said one or more settings. If satisfactory settings are found, this allows the user to configure the sensor with these settings, either immediately if the sensor has already been installed or later (e.g. upon installation of the sensor) if not.

Said at least one processor may be configured to allow said user to specify and/or adapt said location for said sensor in said image. By allowing the user to specify and/or adapt the location in the image instead of in e.g. a model, the effect of specifying or adapting the location can be shown immediately.

Said at least one processor may be configured to allow said user to specify said location for said sensor in a model of at least part of a building, said image capturing at least a portion of said at least part of said building. By allowing the user to specify and/or adapt the location in such a model instead of in e.g. the image itself, it may be easier for the user to position the sensor in 3D space, i.e. to know which of the x, y and z coordinates of the virtual representation will change when moving the virtual representation of the sensor in a certain way.

Said at least one processor may be configured to determine said location for said sensor as a suggested location for said sensor based on information relating to at least a part of a building, said image capturing at least a portion of said at least part of said building. By automatically determining and suggesting a certain location for the sensor, it becomes easier and takes less time for the user to determine a satisfactory or optimal location.

Said at least one processor may be configured to determine one or more suggested settings for said sensor based on information relating to at least a part of a building, said image capturing at least a portion of said at least part of said building, and determine said detection zone of said sensor in relation to said image based on said one or more suggested settings. By automatically determining and suggesting certain settings for the sensor, it becomes easier and takes less time for the user to determine satisfactory or optimal settings.

In a second aspect of the invention, the method comprises obtaining an image captured with a camera, determining a location for a sensor, determining a detection zone of said sensor in relation to said image based on said location determined for said sensor, and displaying said image and virtual representations of said sensor and said detection zone superimposed over said image, wherein a user interface is provided for allowing a user to specify or adapt at least one property for said sensor, said at least one property including said location. The method may be implemented in hardware and/or software.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: obtaining an image captured with a camera, determining a location and an orientation for a sensor, determining a detection zone of said sensor in relation to said image based on said location and said orientation determined for said sensor, and displaying said image and virtual representations of said sensor and said detection zone superimposed over said image, wherein a user interface is provided for allowing a user to specify or adapt at least one property for said sensor, said at least one property including at least one of said location and said orientation.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
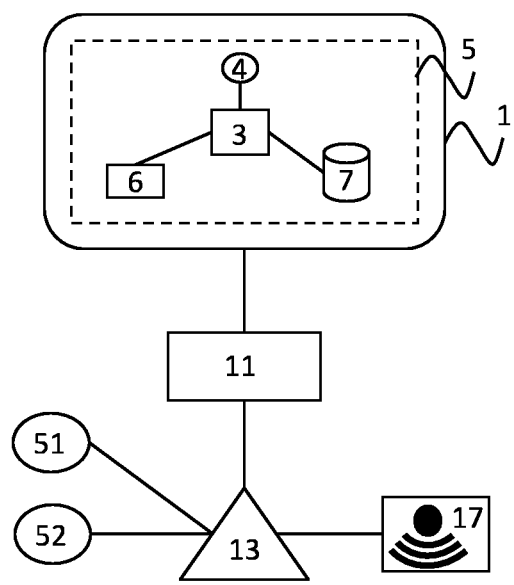
FIG. 1 is a block diagram of an embodiment of the electronic device of the invention.

FIG. 1 shows an embodiment of the electronic device of the invention. A tablet 1 comprises a processor 3, a camera 4, a display 5, a transceiver 6 and storage means 7. The tablet 1 is connected to a wireless access point 11. A bridge 13, e.g. a Philips Hue bridge, is also connected to the wireless access point 11, e.g. via an Ethernet link. Lights 51 and 52 (e.g. Philips Hue lights) a motion sensor 17 (e.g. Philips Hue motion sensor) communicate with the bridge 13, e.g. via Zigbee.

The processor 3 is configured to obtain an image captured with the camera 4 and determine a location and an orientation for the sensor 17. Sensor 17 may already have been installed or may yet to be installed at that point in time. The processor 3 is further configured to determine a detection zone of the sensor 17 in relation to the image based on the location and the orientation determined for the sensor 17 and display the image and virtual representations of the sensor and the detection zone superimposed over the image. The processor 3 is configured to allow a user to specify or adapt at least one property for the sensor 17. The at least one property includes at least one of the location and the orientation.

The processor 3 is further configured to obtain a further image captured with the camera 4, determine a further detection zone of the sensor 17 in relation to the further image based on the at least one adapted property, and display the further image and virtual representations of the sensor and the further detection zone superimposed over the further image. The operation of the tablet 1 is further explained in the description of FIG. 2.

In the embodiment of the tablet 1 shown in FIG. 1, the tablet 1 comprises one processor 3. In an alternative embodiment, the tablet 1 comprises multiple processors. The processor 3 of the tablet 1 may be a general-purpose processor, e.g. from Qualcomm or ARM-based, or an application-specific processor. The processor 3 of the tablet 1 may run an Android or iOS operating system for example. The storage means 7 may comprise one or more memory units. The storage means 7 may comprise one or more hard disks and/or solid-state memory, for example. The storage means 7 may be used to store an operating system, applications and application data, for example.

The transceiver 6 may use one or more wireless communication technologies to communicate with the Internet access point 11, for example. In an alternative embodiment, multiple transceivers are used instead of a single transceiver. In the embodiment shown in FIG. 1, a receiver and a transmitter have been combined into a transceiver 6. In an alternative embodiment, one or more separate receiver components and one or more separate transmitter components are used. The display 5 may comprise an LCD or OLED panel, for example. The display 5 may be a touch screen. The camera 4 may comprise a CMOS sensor, for example. The tablet 1 may comprise other components typical for a tablet such as a battery and a power connector.

In the embodiment of FIG. 1, the electronic device of the invention is a tablet. In a different embodiment, the electronic device of the invention may be a mobile phone, augmented reality glasses, or a PC, for example. In the embodiment of FIG. 1, the camera 4 is part of the electronic device. In a different embodiment, the camera 4 may be external to the electronic device. For example, the camera 4 may be part of an (other) mobile or wearable device of the user, e.g. a smart phone or augmented reality glasses, or a stationary camera, e.g. the camera of a (stationary) smartTV, the camera of a smart assistant (e.g. Amazon Echo Show) or a security camera. Multiple cameras may be used instead of a single camera. In an alternative embodiment, the sensor may be another kind of sensor, e.g. an omnidirectional sensor like a microphone. If the sensor is an omnidirectional sensor, it may not be necessary to allow the user to specify and/or adapt the orientation. The invention may be implemented using a computer program running on one or more processors.

Figure 2:
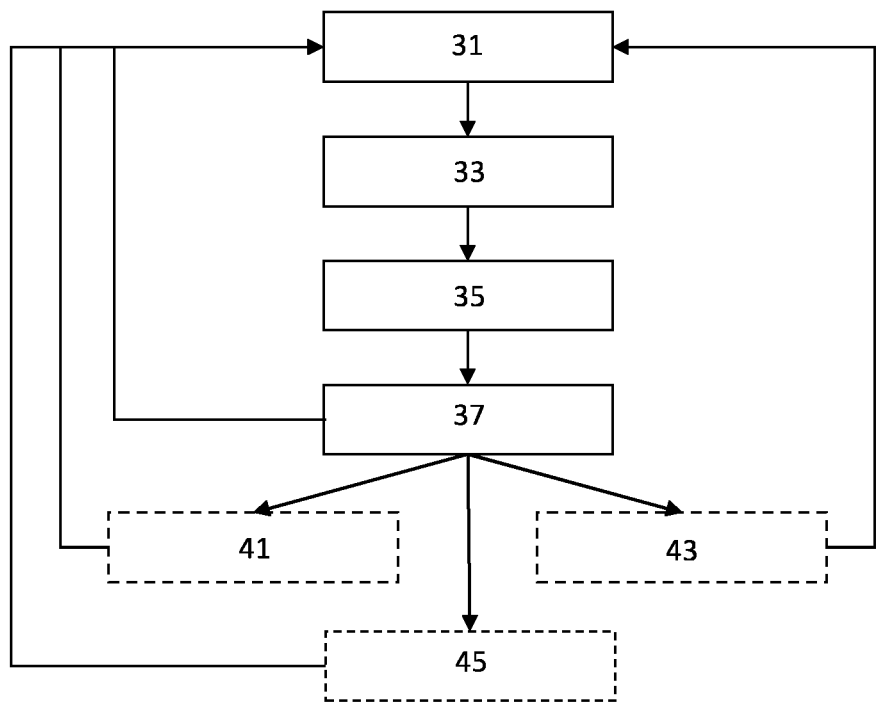
FIG. 2 is a flow diagram of an embodiment of the method of the invention.

An embodiment of the method of the invention is shown in FIG. 2. A step 31 comprises obtaining an image captured with a camera. A step 33 comprises determining a location and an orientation for a sensor. A step 35 comprises determining a detection zone of the sensor in relation to the image based on the location and the orientation determined for the sensor. A step 37 comprises displaying the image and virtual representations of the sensor and the detection zone superimposed over the image.

A step 41, a step 43 or a step 45 may be performed after step 37. Alternatively, step 31 may be repeated after step 37. If step 31 is performed again, step 31 comprises obtaining a further image captured with the camera. Step 35 then comprises determining a further detection zone of the sensor in relation to the further image based on the at least one adapted property and step 37 then comprises displaying the further image and virtual representations of the sensor and the further detection zone superimposed over the further image. Steps 31-37 may be repeated as often as desired/needed.

Step 41 comprises receiving user input to adapt sensor configuration settings. Step 43 comprises simulating dynamic input to the sensor. Step 45 comprises storing adjusted sensor configuration settings. Step 31 may be repeated after steps 41, 43 and 45. A user interface is provided for allowing a user to specify or adapt at least one property for the sensor. The at least one property includes at least one of the location and the orientation. The location and the orientation for the sensor can be specified or adapted in step 33. Steps 31-45 are now described in more detail.

Step 31:

The images captured in step 31 may be 2D images or 3D images. If the augmented reality user interface is realized on a display of a mobile phone or tablet, then information will typically be superimposed over 2D images. If the augmented reality user interface is realized on augmented reality glasses, then information will typically be superimposed over 3D images. To implement augmented reality, the captured images need to be displayed in real-time or near-real-time, i.e. shortly after they were captured. Even if images can only be displayed in 2D, capturing 3D images may still be beneficial. For example, a Building Information Model (BIM) may be constructed from these captured 3D images. A BIM may range from an empty room with only walls/doors/windows in the proper location to images that also contain more details like the furniture and installed lighting/sensors. This BIM may be used in later steps.

Step 33:

In step 33, a location and an orientation is determined for an already installed sensor or for a yet to be installed sensor. If the sensor has already been installed, the location and orientation of this sensor may be determined automatically. Alternatively, the user may be allowed to specify the location and the orientation of the sensor or the method may involve suggesting a location and orientation for the sensor, which may be different than the actual location and/or actual orientation. If the sensor has not yet been installed, and perhaps not even been purchased yet, the user may be allowed to specify the location and the orientation for the sensor or the method may involve suggesting a location and orientation for the sensor. In both cases, the sensor is preferably added to a 3D model (e.g. BIM) of at least part of a building of which the image captures at least a portion.

The user may be allowed to specify the location and orientation for the sensor in the image, e.g. by tapping a position on the touch display that is rendering the image, or in a 2D representation (e.g. floor plan) or 3D representation of the 3D model. The location and orientation of other sensors and/or of lighting devices may be determined or specified in a similar manner, possibility using additional touch gestures like drag, flick, pinch, spread, and rotate. Both already installed and yet to be installed devices may be added to the 3D model of the building.

It may be possible to detect these devices and their locations (and possibly their orientations) automatically from the captured image(s) using object detection methods. This can be done in various ways, for instance, an app on a mobile device may use local processing for pattern recognition (or other techniques) to identify device classes (e.g. light strip, light Bulb or motion sensor). Another option is that the information on the location of sensors and lighting devices is retrieved from the lighting system. For example, automatic localization of these devices can be done through RF signal strength analysis (beacons) or using Visible Light Communication (VLC).

The orientation of the sensor(s) is often important, because a sensor usually has a limited viewing angle and the detection zone is therefore dependent on this orientation. The orientation from an already installed sensor can be retrieved by integrating a compass (orientation to Earth magnetic field) and/or accelerometer (orientation to the Earth gravity) in the sensor device and link this orientation to the axes of the sensor. Another option is that the orientation is derived from analysis of the captured image. The orientation is included in the 3D model and the user may be allowed to manipulate the orientation in the augmented reality view or in the 3D model (e.g. rotate gesture on the touch screen region where the sensor is depicted).

A location and orientation for the sensor may be suggested based on information relating to at least a part of the building. The captured (3D) image may be analyzed to determine a good location and orientation for the sensor.

This requires capturing one or more (3D) images from which the 3D geometry of the environment is derived. The 3D geometry preferably indicates surfaces on which sensors can be placed and the dimensions of the room(s). In addition to the 3D spatial input, usage info may be retrieved to determine optimal sensor positions and configuration settings. Such usage info may come from explicit user inputs or may be derived from observed human behavior (e.g. frequently followed pathways or frequently used seats), from previously configured room type(s) (e.g. living room, hall or kitchen), from pre-defined usage templates, or from (analyzed) system usage data, for example. Human behavior may be observed using a stationary camera, for example. For instance, one or more motion sensors may be located such that they are directed towards typical user positions and/or that they can detect people entering the area.

Step 35:

In step 35, information related to the sensor is retrieved, e.g. from a product database of the manufacturer of the sensor device and/or from the sensor device itself. As a first example, a detection zone at maximum sensitivity may be retrieved from a product database, a sensitivity may be retrieved from the sensor device and a detection zone at the selected (e.g. actual or recommended) sensitivity may be determined from this information. As a second example, a sensor range and a detection angle may be retrieved from a product database or the sensor device and a detection zone may be determined from this information. The determined detection zone may be added to the 3D model using on the location and orientation determined for the sensor.

In order to determine where and how to represent the detection zone, first the relation between the 3D model and the contents of the image needs to be determined. This may be implemented by determining which objects in the 3D model, e.g. fixed lighting devices, doors, windows, or other objects fixed in the building, are represented in the captured image. As soon as these objects have been identified, the location and angle of the camera can be determined in relation to the objects in the 3D model, i.e. as if the camera were part of the 3D model.

A 2D or 3D view (representation) of the 3D modelled detection zone from the determined camera location in the 3D model and with the determined camera angle can then be determined. The creation of a 2D view of one or more objects in a 3D model/environment can be implemented using conventional techniques for representing 3D environments on 2D screens.

Step 35 further comprises determining the position at which the detection zone needs to be superimposed in the image. This can be implemented by determining where a sensor is located in the 3D model compared to the modelled objects that were identified in the image and using this information to determine where the sensor should be represented in the image compared to the detected locations of these objects in the image.

Step 37:

In step 37, the captured image is displayed and the (virtual) representation of the detection zone determined in step 35 is displayed superimposed over the image (e.g. as a graphical overlay) at the position determined in step 35. A (much smaller) virtual representation of the sensor is displayed superimposed over the image (e.g. as a graphical overlay) at the same position.

Step 41:

In addition to allowing the user to specify or adapt the location and orientation for the sensor in step 31, step 41 allows the user to adapt one or more configuration settings for the sensor to configure it to his needs. This may be done before and/or after the dynamic input to the sensor is simulated in step 43. For example, if the motion sensor triggers too fast, users may adapt the sensitivity, detection time, detection range, or detection field of view of the motion sensor. The virtual representation of the detection zone displayed in step 37 helps the user determine how to adapt the configuration settings. In case no current configuration settings could be retrieved in step 35, e.g. because the sensor has not yet been installed or does not allow access to these settings, default settings can be used.

In a handheld device embodiment, the adaption of these sensor configuration settings may be done via touch gestures on the augmented reality image that is displayed on a touch screen. In a wearable device embodiment, the user input may be done by gestures made in front of the wearable device, e.g. augmented reality glasses. In this case, the gestures can be detected by one or more sensors integrated in the wearable device.

Instead of or in addition to allowing the user to directly adjust sensor settings, one or more sensor settings may be suggested to the user based on automatically obtained information and/or on usage information input by the user. Step 41 may involve determining one or more suggested settings for the sensor based on information relating to at least a part of a building (of which the image captures at least a portion) and determining the detection zone of the sensor in relation to the image based on the one or more suggested settings.

For example, usage information may be used that identifies the various area types, e.g. indicating what the most frequently populated areas are, and indicates where the typical entrance and pathways are located. Sensor configuration settings can then be generated according to those identified areas. Other examples of usage information that may be used have been provided in relation to step 33.

Step 43:

In step 43, dynamic input to the sensor is simulated and a dynamic virtual representation of the dynamic input is displayed superimposed over the image to render the behavior of the light system that comprises the sensor. If the sensor comprises a presence sensor, the dynamic virtual representation may be an animation of a virtual character walking through the physical space captured by the image to visualize/simulate the behavior of the lighting system in reaction to the presence sensor. Each iteration of step 43, a next frame of the animation may be displayed. The behavior of the character may be based on a general model of typical user behavior, or modelled behavior of the system's current user(s). The animation preferable has the same scale as the displayed image and the displayed virtual representation of the detection zone. The user may be able to configure the height of the character, e.g. set it to his own height or to his child's height.

Step 43 may further comprise simulating the dynamic input causing the sensor to generate sensor output and controlling a virtual lighting device (e.g. added by the user in step 33) and/or an installed (i.e. physical) lighting device (if available) based on the sensor output. The (virtual/installed) lights react as if real objects are in the physical space. In case a virtual lighting device is controlled, a light effect generated by the virtual lighting device in response to the sensor output may be simulated. The light effect is generated based on a location and an orientation of the virtual lighting device. The simulated light effect is the displayed superimposed over the image.

A user may be able to start the visualization of pre-defined use cases by selecting a button on the display device and/or may be able to create his own behavior (e.g. dragging objects in or drawing a path). Optionally, also real objects can be sensed in the environment (e.g. real person walking in the room) and trigger the lights as if the represented sensor(s) were actually present at the represented location and with the represented orientation. In this case, the camera image can be used to detect these objects and their parameters (e.g. location, trajectory) to use this as input to the virtual sensor in the simulation.

In case an installed lighting device is controlled, the simulated sensor output is sent to the lighting control system. The installed lights are controlled based on this simulated sensor data to demonstrate the behavior of the system to the user. When an installed sensor is connected to an installed controller, it may be possible to use a "man in the middle" approach by replacing the data from the installed sensor with the simulated sensor data and forwarding this modified data to the installed controller.

Step 45:

In step 45, the user is allowed to indicate whether he wants to store one or more suggested settings or the one or more settings resulting from an adaptation performed in step 41. If the sensor has already been installed, these one or more settings may be stored in the sensor (device) itself, thereby configuring the sensor. If the sensor has not yet been installed, these one or more settings may be stored in another device, e.g. the device rendering the augmented reality visualization, and transferred to the sensor (device) after it has been installed. Alternatively, these one or setting may be stored in a control device that contains the logic to respond to the sensor output, thereby configuring the sensor.

Figure 3:
FIG. 3 shows an example of a camera image.

An example in which the method of the invention is used with a motion sensor is illustrated with the help of FIGS. 3 to 8. In the example, a user is interested in buying a motion sensor for his kitchen, but wants to try out how this will work. He takes his tablet, starts the Philips hue app, and selects the menu for in-app purchasing. This will start an augmented reality function in which the user can point his smartphone camera to the region of his kitchen where he wants to install a motion sensor. FIG. 3 shows the user capturing the kitchen where he wants to install the motion sensor with the camera of his tablet. From analysis of the camera image, the kitchen is detected and information from the Hue lights 51 and 52 and their locations are retrieved from the lighting system.

Figure 4:
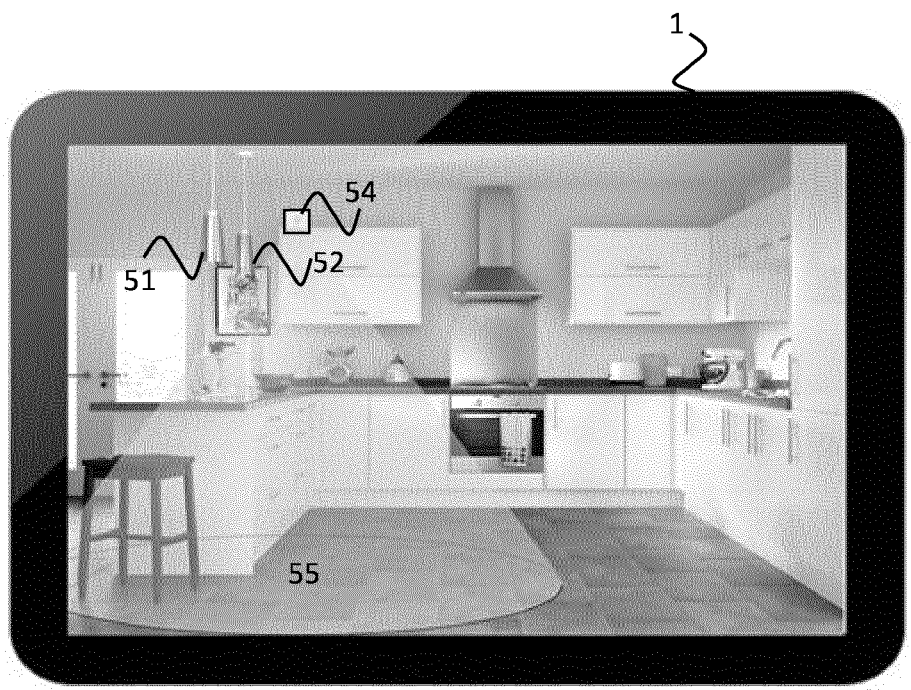
FIG. 4 shows an example image in which virtual representations of a sensor and a detection zone are superimposed over the image of FIG. 3.

The detection range of the motion sensor is visualized in augmented reality. FIG. 4 shows a virtual representation 54 of a sensor that has been placed at the shown location by a user selecting the sensor and then tapping this location on the touch screen. A virtual representation 55 of the detection zone of the motion sensor is displayed superimposed over the image. In the example of FIGS. 3 to 8, the detection zone representation consists of a single area. However, in practice, the probability of an object being detected is lower near the edges of the detection zone. The detection zone representation could be divided into a plurality of (e.g. differently colored) areas with a similar probability of an object being detected in this area. In other words, different areas represent different detection accuracies.

Figure 5:
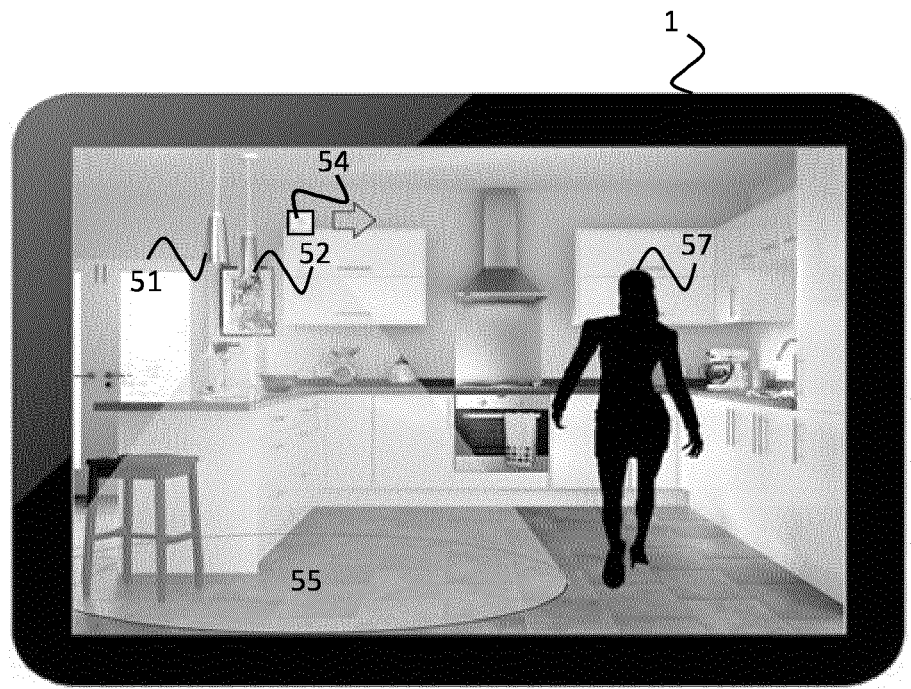
FIG. 5 shows an example image in which a virtual character is superimposed over the image of FIG. 4.
Figure 6:
FIG. 6 shows an example image in which the location of the sensor represented in FIG. 4 has been adapted.

FIG. 5 shows the reproduction of an animation 57 of a person walking in the kitchen. Since the existing Hue lights 51 and 52 in the kitchen are not switched on, the user repositions the virtual representation 54 of the sensor to the right. The new location for the sensor is shown in FIG. 6. In the example of FIGS. 3 to 8, the sensor is yet to be installed. If the sensor had already been installed, the actual sensor could be blurred or otherwise removed in the image of FIG. 6.

Figure 7:
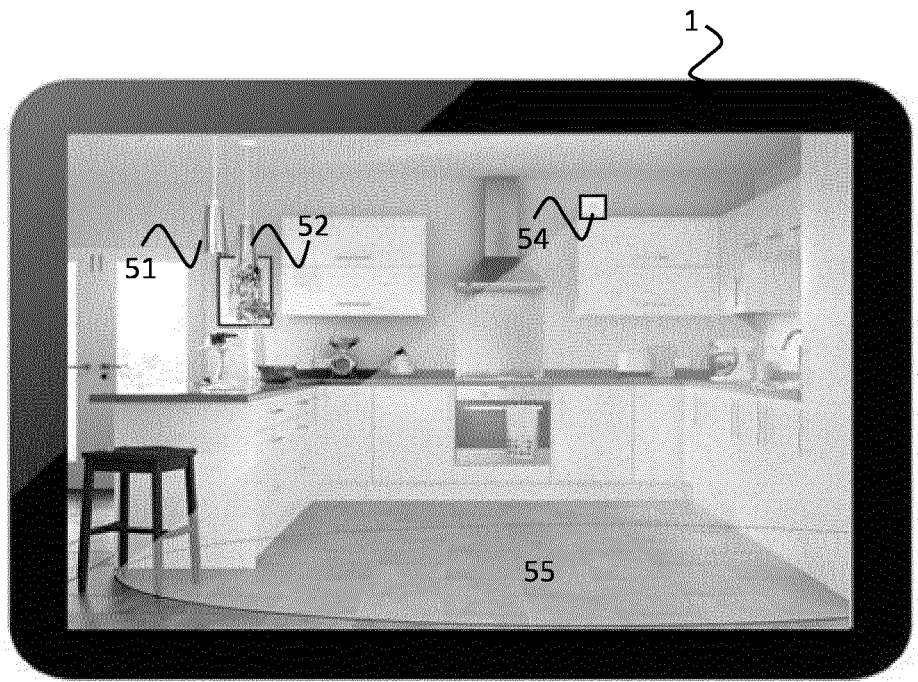
FIG. 7 shows an example image in which a setting of the sensor represented in FIG. 6 has been adapted.
Figure 8:
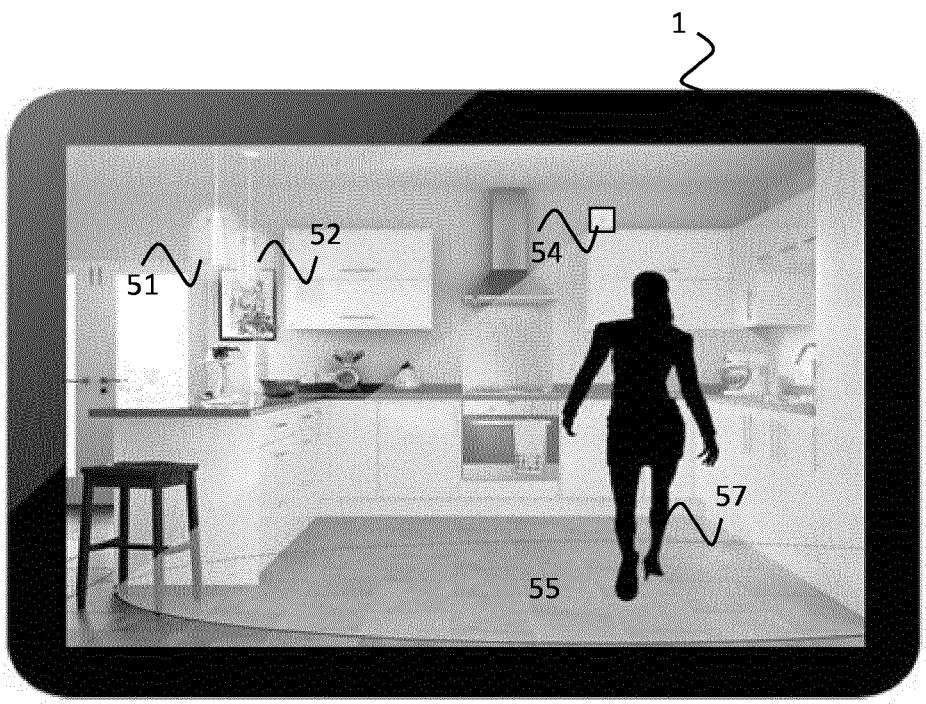
FIG. 8 shows an example image in which a virtual character is superimposed over the image of FIG. 7.

Since the detection zone of the sensor is not wide enough, the user widens the detection zone with a pinch gesture. The widened detection zone is shown in FIG. 7 in which the virtual representation 55 of the detection zone has been modified to reflect the adaptation. FIG. 8 shows the animation 57 of the person walking into the kitchen being reproduced again and as soon as the virtual character enters the detection zone of the motion sensor, the existing Hue lights 51 and 52 in the kitchen are switched on.

In this example, after a first placement of the virtual motion sensor, the lights did not turn on as the virtual character entered the kitchen. The user then dragged and dropped the motion sensor to a different location to have a better coverage of the region of interest. Furthermore, he widened the detection zone of the sensor with a touch gesture on the touch screen.

Optionally, the app may suggest a type and location of a sensor (or multiple sensors when appropriate), based on the behavior requested by the user (e.g. automatic switching on of the lights when someone enters the kitchen). This suggestion can be visualized in augmented reality as described above, indicating the detection zone and showing the system behavior when a virtual character enters and walks around the room. The user can then further optimize/modify the proposed solution and see the implications on the (simulated) behavior.

When satisfied with the virtual sensor, its settings and the resulting lighting system behavior, the user may immediately order the virtual sensor and installed it in his home, e.g., as sensor 17 of FIG. 1. Preferably the location, orientation and settings of each purchased sensor is stored, so the user can recall them at the time of installation (e.g. in a form of a personalized installation guide within the lighting control app). After installation any settings can be automatically applied.

Figure 9:
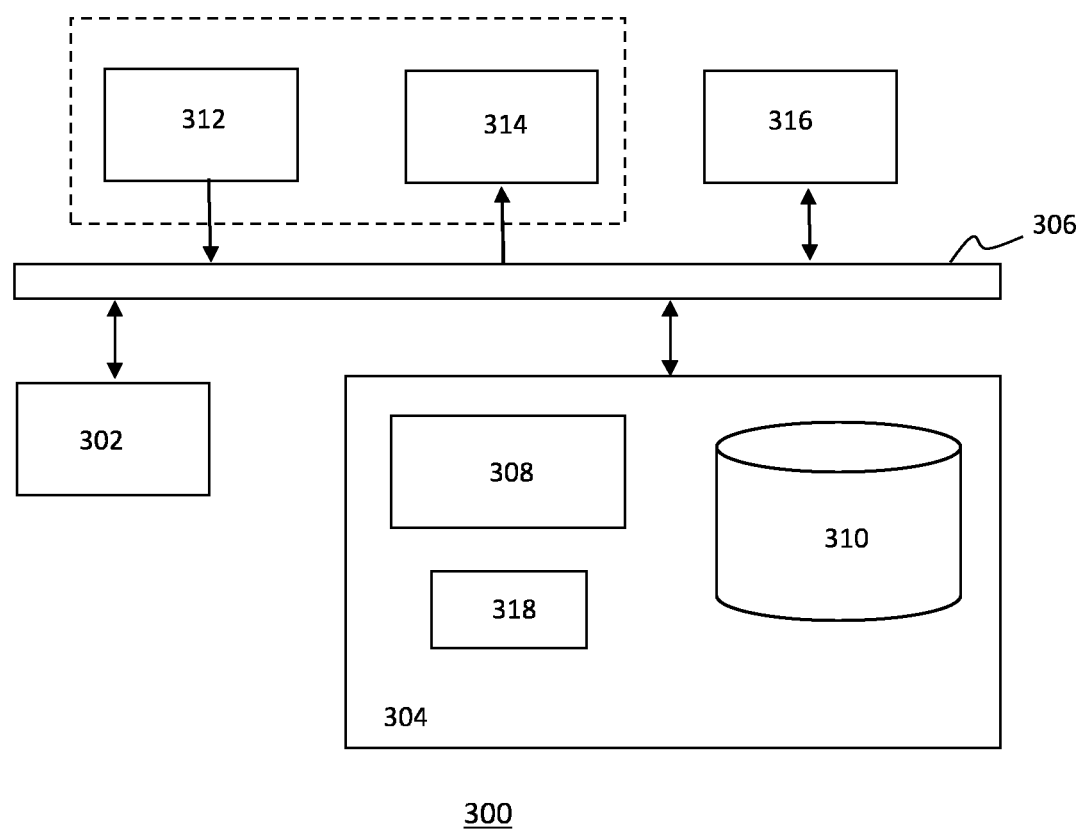
FIG. 9 is a block diagram of an exemplary data processing system for performing the method of the invention.

FIG. 9 depicts a block diagram illustrating an exemplary data processing system that may perform the method as described with reference to FIG. 2.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device comprising at least one processor configured to:
   obtain an image captured with a camera,
   determine a location for a to be installed sensor,
   determine a detection zone of said to be installed sensor in relation to said image based on said location determined for said to be installed sensor,
   display, in real-time or near-real-time, said image and virtual representations of said to be installed sensor and said detection zone superimposed over said image,
   wherein said at least one processor is configured to allow a user to specify or adapt at least one property for said to be installed sensor, said at least one property including at least said location,
   simulate dynamic input causing said to be installed sensor to generate sensor output, and
   control a virtual lighting device and/or an installed lighting device based on said sensor output.

2. An electronic device as claimed in claim 1, wherein said at least one processor is configured to:
   simulate dynamic input to said to be installed sensor, and
   display a dynamic virtual representation of said dynamic input superimposed over said image.

3. An electronic device as claimed in claim 2, wherein said to be installed sensor comprises a presence sensor and said at least one processor is configured to display an animation of a virtual character walking through the physical space captured by said image as said dynamic virtual representation.

4. An electronic device as claimed in claim 2, wherein said at least one processor is configured to:
   simulate said dynamic input causing said to be installed sensor to generate sensor output, simulate a light effect generated by said virtual lighting device in response to said sensor output, said light effect being generated based on a location and an orientation of said virtual lighting device, and display said simulated light effect superimposed over said image.

5. An electronic device as claimed in claim 1, wherein said at least one property for said to be installed sensor further includes an orientation for said to be installed sensor.

6. An electronic device as claimed in claim 1, wherein said at least one property for said to be installed sensor further includes one or more settings for said to be installed sensor.

7. An electronic device as claimed in claim 6, wherein said at least one processor is configured to allow said user to configure said to be installed sensor with said one or more settings.

8. An electronic device as claimed in claim 1, wherein said at least one processor is configured to:
obtain a further image captured with said camera,
determine a further detection zone of said to be installed sensor in relation to said further image based on said at least one adapted property, and
display said further image and virtual representations of said to be installed sensor and said further detection zone superimposed over said further image.

9. An electronic device as claimed in claim 1, wherein said at least one processor is configured to allow said user to specify said location for said to be installed sensor in said image.

10. An electronic device as claimed in claim 1, wherein said at least one processor is configured to allow said user to specify said location for said to be installed sensor in a model of at least part of a building, said image capturing at least a portion of said at least part of said building.

11. An electronic device as claimed in claim 1, wherein said at least one processor is configured to determine said location for said to be installed sensor as a suggested location for said to be installed sensor based on information relating to at least a part of a building, said image capturing at least a portion of said at least part of said building.

12. An electronic device as claimed in claim 1, wherein said at least one processor is configured to:
determine one or more suggested settings for said to be installed sensor based on information relating to at least a part of a building, said image capturing at least a portion of said at least part of said building, and
determine said detection zone of said to be installed sensor in relation to said image based on said one or more suggested settings.

13. A method of superimposing a detection zone over an image, comprising:

obtaining an image captured with a camera;
determining a location for a to be installed sensor;
determining a detection zone of said to be installed sensor in relation to said image based on said location determined for said to be installed sensor;
displaying, in real-time or near-real-time, said image and virtual representations of said to be installed sensor and said detection zone superimposed over said image;
wherein a user interface is provided for allowing a user to specify or adapt at least one property for said to be installed sensor, said at least one property including said location;
simulating dynamic input to cause said to be installed sensor to generate sensor output; and
controlling a virtual lighting device and/or an installed lighting device based on said sensor output.

14. The method of claim 13, wherein said to be installed sensor comprises a presence sensor and displaying an animation of a virtual character walking through the physical space captured by said image as said dynamic virtual representation.

15. The method of claim 13, comprising:
simulating said dynamic input causing said to be installed sensor to generate sensor output,
simulating a light effect generated by said virtual lighting device in response to said sensor output, said light effect being generated based on a location and an orientation of said virtual lighting device, and
displaying said simulated light effect superimposed over said image.

16. The method of claim 13, wherein said at least one property for said to be installed sensor further includes an orientation for said to be installed sensor.

17. The method of claim 13, wherein said at least one property for said to be installed sensor further includes one or more settings for said to be installed sensor, and allowing said user to configure said to be installed sensor with said one or more settings.

18. The method of claim 13, comprising:
obtaining a further image captured with said camera,
determining a further detection zone of said to be installed sensor in relation to said further image based on said at least one adapted property, and
displaying said further image and virtual representations of said to be installed sensor and said further detection zone superimposed over said further image.

19. A non-transitory computer readable medium storing at least one software code portion, the software code portion, when executed by one or more processors of a computer system, being configured to cause the one or more processors to perform the method of claim 13.

* * * * *